United States Patent [19]
Leroux et al.

[11] 3,947,305
[45] Mar. 30, 1976

[54] BUILDING A LAMINATION OF FIBERGLASS REINFORCED POLYESTER RESIN ON A ROTATING MANDREL

[75] Inventors: Pierre J. Leroux; D. van de Werve de Schilde, both of Angleur, Belgium

[73] Assignee: The Standard Oil Company, Cleveland, Ohio

[22] Filed: Jan. 22, 1973

[21] Appl. No.: 325,826

[52] U.S. Cl. ............... 156/62.4; 156/173; 156/431
[51] Int. Cl.² ................. B32B 17/04; B65H 81/02
[58] Field of Search ........ 156/62.2, 62.4, 172, 173, 156/175, 429, 431, 578, 179, 161, 162, 169; 117/105.4

[56] References Cited
UNITED STATES PATENTS

| 2,614,058 | 10/1952 | Francis | 156/175 |
| 2,656,873 | 10/1953 | Stephens | 156/175 |
| 2,927,623 | 3/1960 | Huisman et al. | 156/200 |
| 3,379,591 | 4/1968 | Bradley | 156/173 |
| 3,464,879 | 9/1969 | Poulsen | 156/429 |
| 3,655,468 | 4/1972 | Bastone et al. | 156/62.2 |
| 3,716,431 | 2/1973 | Townsend et al. | 156/62.4 |

Primary Examiner—Daniel J. Fritsch
Attorney, Agent, or Firm—Herbert D. Knudsen

[57] ABSTRACT

The invention is a process for building a lamination of a fiberglass reinforced polyester resin on a rotating continuous belt forming a spirally rotating mandrel consisting of pouring resin on the top of the mandrel from a substantially horizontal surface, depositing chopped strands of fiberglass onto the surface of the resin and impressing the chopped fiberglass into the resin with parallel strands of a suitable material. The specific method of pouring the resin onto the mandrel surface and the application of chopped fiberglass and parallel strands are also part of the invention.

5 Claims, 2 Drawing Figures

3,947,305

BUILDING A LAMINATION OF FIBERGLASS REINFORCED POLYESTER RESIN ON A ROTATING MANDREL

BACKGROUND OF THE INVENTION

The application of polyester resin and fiberglass onto a spirally rotating mandrel is a new method of making pipes and tanks having a diameter of up to 9 feet or more. Since the fiberglass reinforced polyester tanks and pipes are new arrivals on the market, the technology for making such articles is not highly developed.

Resin is normally deposited on a spirally rotating mandrel by transfer with a roller from a resin box or by spraying the resin through nozzles onto the surface of the rotating mandrel. Use of resin boxes precludes the use of chopped fiberglass for the chopped fiberglass would stick to the roller and fall into the box. As a consequence, rolls of more expensive fiberglass mats are used. Spraying resin through nozzles cannot be used with resins filled with particulate materials, such as inorganic fillers because the filler can become lodged in the nozzle and the flow of resin is restricted.

Fiberglass rovings that contain many individual strands of fiberglass are available commercially at a much lower price than fiberglass mats. Choppers for these rovings are also known that can chop the rovings to pieces of various lengths.

It is an object of the present invention to provide a convenient and inexpensive method of building a fiberglass reinforced polyester lamination on a spirally rotating mandrel.

SUMMARY OF THE INVENTION

It has now been discovered according to the present invention that a fiberglass reinforced polyester lamination is conveniently and inexpensively built on a spirally rotating mandrel in a continuous process by pouring the resin on the top of the rotating mandrel from a substantially horizontal surface, depositing chopped fiberglass on the surface of the resin along the top of the rotating mandrel and impressing the chopped fiberglass into the resin by the pressure of a plurality of strands that run substantially parallel to the path of a point on the surface of the rotating mandrel. The present invention is also directed toward the particular method of applying the resin in a flow from a horizontal surface and the application of chopped fiberglass and the method of maintaining the chopped fiberglass on the rotating mandrel by means of parallel strands.

DESCRIPTION OF THE DRAWING

Referring to FIG. 1, the rotating mandrel surface, 1, is rotating in the direction shown about an axis, not shown. Resin feed box, 2, is mounted above the rotating mandrel surface, 1, so that the bottom surface of the resin feed box, 2, is substantially horizontal and in close proximity to the top of the mandrel surface, 1. Resin flows from the resin box onto the rotating mandrel surface, 1.

Rovings, 3, which consist of a plurality of fiberglass strands are fed into a chopper, 4, which is mounted above the rotating mandrel surface, 1. The fiberglass strands in the rovings are chopped by chopper, 4, into pieces of given lengths to form chopped fiberglass. The chopped fiberglass falls through chute, 5, onto the surface of the resin which has been deposited on the rotating mandrel surface, 1.

Parallel strands, 6, are continuously fed onto the rotating mandrel surface, 1, which contains the resin and chopped fiberglass. The pressure of the parallel strands, 6, against the chopped fiberglass and resin on the rotating mandrel surface, 1, impress the chopped strands into the resin. At the same time, the parallel strands, 6, are normally incorporated into the fiberglass reinforced polyester.

Figure 1:
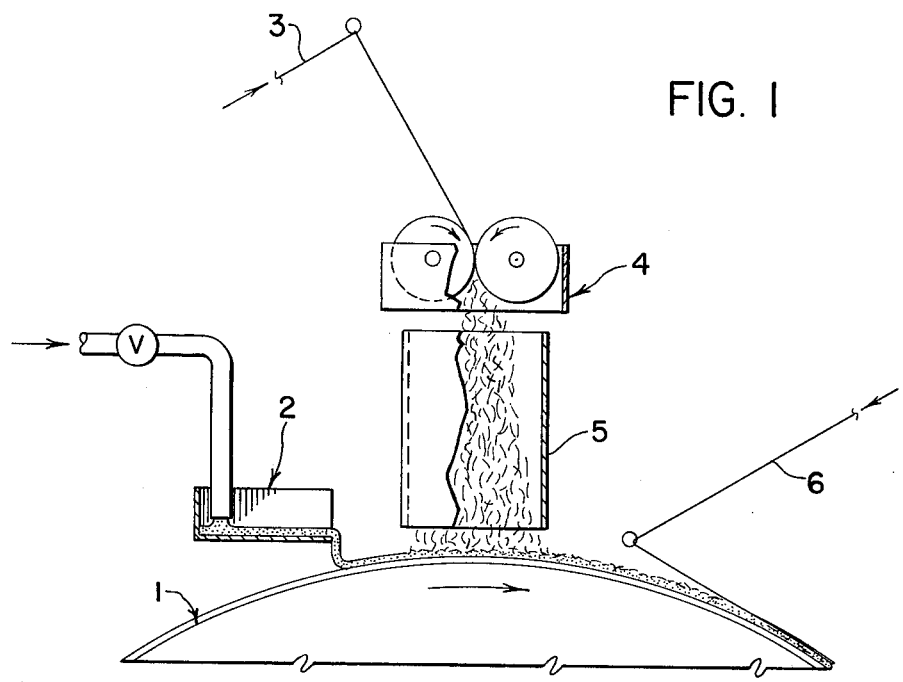
FIG. 1 shows a side view of the rotating mandrel surface and the resin, fiberglass and parallel strand feed.
Figure 2:
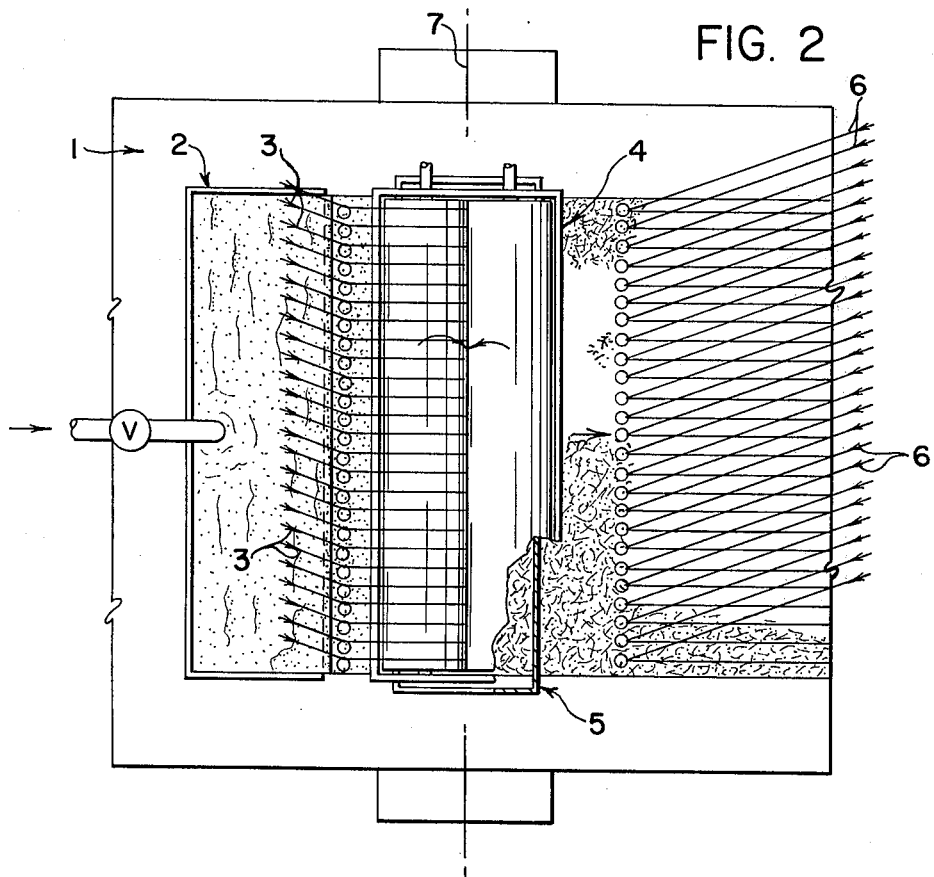
FIG. 2 shows the top view of the rotating mandrel and the resin, fiberglass and parallel strand feed.

Referring to FIG. 2, a top view of the resin, chopped strands and strand application. The mandrel is rotated about axis, 7. The resin is fed into the rear of the resin box, 1, by means of one or several tubes. The width of the box is so calculated that the resin falls in an essentially uniform sheet having a width determined by the width of the sides of the mouth of the resin box, 1.

Rovings, 3, are fed into the chopper, 4, and the chopped fiberglass falls down chute, 5, onto the resin.

Parallel strands, 6, are continuously fed onto the chopped fiberglass and resin to impress the chopped fiberglass into the resin. Due to the spiral movement of the belt forming the mandrel, a point on the mandrel surface rotates under the resin, fiberglass and strand applications several times before it leaves this zone.

DETAILED DESCRIPTION OF THE PREFERRED EMBODIMENTS

One very important aspect of the present invention is the feed of the resin from an essentially horizontal surface. This applies a substantially uniform sheet of resin to the rotating mandrel surface without disruption of the chopped strands on the surface of the mandrel or excessive amounts of the resin vapor being transmitted to the working area.

The width of the flow of resin is controlled primarily by the width at the mouth of the box where the resin is deposited upon the mandrel surface. The thickness of the resin coating is controlled primarily by the amount and viscosity of the resin fed into the resin box.

The chopped fiberglass is obtained by chopping strands of fiberglass with a chopping machine to obtain pieces of fiberglass having substantially uniform length. These chopping machines are known. The chopping machine cuts the strands into lengths of about 1 to about 25 cm. Normally, chopped fiberglass having a length of about 3 to about 12 cm. are preferred. Chopping rovings containing a number of fiberglass strands is the preferred method of obtaining the chopped fiberglass.

In the preferred practice of the invention, the chopped fiberglass falls on the resin by force of gravity in a random distribution and orientation. This random placement is conveniently obtained by allowing the choppings to fall down a chute. The open bottom end of the chute is close to the surface of the rotating mandrel. The preferred width of the chute at the exit point of the chopped strands is substantially the same as the width of the resin applied to the mandrel. The height of the chute and length of the bottom of the chute is not very important so long as a random distribution and orientation of the chopped fiberglass is obtained.

The strands applied to the chopped fiberglass perform three essential functions. First, they impress the chopped fiberglass into the resin so that the fiberglass is impregnated with the resin. Second, the strands hold the chopped fiberglass onto the surface of the mandrel as it rotates. Third, the strands permit the use of rollers to press out the entrapped air from the laminate without allowing chopped fibers to stick to the rollers and fall away.

The strands may be made of any material, such as glass filaments, yarn, fiber, metal, wire or thread. The strand must only be flexible enough to be placed on the mandrel surface and have sufficient tensile strength to withstand the pressure applied.

When the strand is incorporated into the finished product, the strand material should not deleteriously affect the properties of the final product. For example, large diameter strands such as fiberglass rovings for example could cause imperfections in the final product because of the lack of uniform resin distribution, poor impregnation and stress concentration—often with a resulting decrease of the tensile and flexural properties of the final laminate.

As is easily seen from the drawing, the preferred embodiment of the invention continuously applies the strands to the chopped fiberglass and resin in a path substantially parallel to the path of the rotation of a point on the mandrel surface. This parallel application of strands is conveniently obtained by use of pig tail holders and the rotation force of the mandrel.

The spacing between the parallel strands is important. This spacing is directly dependent upon the length of the chopped fiberglass—as the length of the pieces of the chopped fiberglass increases, the spacing between the parallel strands may increase. Normally, desirable results are obtained when the spacing between the parallel strands is about 0.2 to about 0.6 times the length of the pieces of chopped fiberglass, with spacings of about 1 to about 3 cm. being preferred.

The pressure applied to the strands to impress the chopped fiberglass into the resin is not substantial. The pressure required to unwind a spool through a pig tail guide usually is enough to produce a desirable product.

The proper tension of the strands is important in the production of a quality product. Too little pressure gives poor impregnation of the fiberglass with the resin. Too much pressure tends to give a rough laminate.

Although the present invention is especially applicable to making pipes or tanks having a flat outer surface, the present invention can also be applied to produce ribbed or corrugated outer surfaces. In such preparations, it may be necessary to modify the horizontal box to deposit resin only on the tops of the ridges rather than as a uniform sheet. This manner of resin deposition gives a very desirable uniform application of resin when used in conjunction with the appropriate rollers after the parallel strand application.

The other aspects of the invention are known from the art. Machines having spirally rotating mandrels are known, see U.S. Pat. No. 3,004,585 and Belgium Patent 2328/68. Basically, these machines have a rotational motion as well as a longitudinal movement along the axis of rotation. The longitudinal movement is rather slow allowing a point on the mandrel surface to pass under the resin, fiberglass and strand applications of the present invention several times.

The resin formulations are well known unsaturated polyester resins with or without additional fillers. The type of resin may vary with the particular pipe or tank made.

In the normal process of making a fiberglass reinforced polyester lamination, there are many steps. The mandrel is coated with a film or other release agent, the resin and fiberglass are deposited, other variations such as ribbing or other sandwich construction can be added and the product is heat cured. The process of the present invention is only one of these steps and can be utilized in conjunction with any one or a combination of other methods of building a fiberglass reinforced pipe or tank to produce a high quality product.

SPECIFIC EMBODIMENTS

Example - Comparison of product made according to the invention with product made with mats and rollers.

A fiberglass reinforced pipe representing the art was prepared using fiberglass mats, continuous fiberglass rovings containing 24 strands to hold the mats in place and resin rolled onto the mat and rovings with a roller in a resin box. Using substantially the same amount of fiberglass and resin as that of the comparative experiment, a pipe of the invention was prepared in an identical fashion using chopped fiberglass of about 8 cm. in length, a resin poured onto the top of the mandrel and parallel strands of nylon thread 2 cm. apart to hold the chopped fiberglass on the mandrel.

The properties of the two products were compared and the difference between the properties are shown in the Table. The tests were conducted by ASTM D638 and ASTM D790.

Table

Comparison of the Product of the Invention with the Product of the Art

| Property (Kg/mm$^2$) | Art Product | Product of Invention |
|---|---|---|
| Tensile strength (hoop) | 15.6 | 17.3 |
| Tensile strength (axial) | 6.1 | 12.1 |
| Flexural strength (hoop) | 24.2 | 26.4 |
| Flexural strength (axial) | 14.2 | 23.7 |
| Tensile modulus (hoop) | 1179 | 1109 |
| Tensile modulus (axial) | 715 | 1119 |
| Flexural modulus (hoop) | 837 | 961 |
| Flexural modulus (axial) | 555 | 1014 |

The data given in the Table above demonstrate a remarkable increase in all of the axial properties of the product of the invention. In addition all hoop properties are improved or not significantly lower.

In the same way as shown above, poured resin can be employed alone to give a convenient and desirable method of applying resin to a rotating mandrel. Also, in the same manner as shown for the invention above, resin is applied by spraying the resin on the mandrel, chopped fiberglass is deposited on the resin and parallel strands are used to impress the chopped fiberglass into the resin. In both cases, a very desirable fiberglass reinforced polyester laminate is obtained.

We claim:

1. A process for building a fiberglass reinforced polyester lamination on a spirally rotating mandrel comprising:
    depositing an unsaturated polyester resin on the surface of the rotating mandrel,
    depositing pieces of chopped fiberglass onto the surface of the polyester resin
    impressing the chopped fiberglass into the resin by the pressure of a plurality of strands that run substantially parallel to the path of a point on the surface of the rotating mandrel and said rotating mandrel having longitudinal movement along the axis of rotation in such a manner that a point on the mandrel surface passes under the resin, fiberglass and strand applications several times.

2. In a process for building a lamination of unsaturated polyester resin and fiberglass on a spirally rotating mandrel, the improvement comprising the steps of pouring a continuous stream of said resin from a substantially horizontal surface onto the top of said rotating mandrel, depositing pieces of chopped fiberglass on the resin, impressing the chopped fiberglass into the resin by force of a plurality of strands that run substantially parallel to the path of a point on the surface of the rotating mandrel and said rotating mandrel having longitudinal movement along the axis of rotation in such a manner that a point on the mandrel surface passes under the resin, fiberglass and strand applications several times.

3. The process of claim 2 wherein said resin is poured from a box mounted above the mandrel, said box having a bottom which is said horizontal surface, three closed sides and an open side, through which open side the resin passes onto the top of the rotating mandrel.

4. The process of claim 2 wherein the pieces of chopped fiberglass have a length of about 1 to about 25 cm.

5. The process of claim 2 wherein spacing between the parallel strands is about 0.2 to about 0.6 times the length of the piece of chopped fiberglass.

* * * * *